United States Patent
Kohinata

(10) Patent No.: US 11,530,323 B2
(45) Date of Patent: Dec. 20, 2022

(54) EPOXY RESIN COMPOSITION, PREPREG AND MOLDED BODY

(71) Applicant: SUMITOMO CHEMICAL COMPANY, LIMITED, Tokyo (JP)

(72) Inventor: Yusaku Kohinata, Tokyo (JP)

(73) Assignee: SUMITOMO CHEMICAL COMPANY, LIMITED, Tokyo (JP)

(*) Notice: Subject to any disclaimer, the term of this patent is extended or adjusted under 35 U.S.C. 154(b) by 0 days.

(21) Appl. No.: 17/251,956

(22) PCT Filed: Jun. 18, 2019

(86) PCT No.: PCT/JP2019/024067
§ 371 (c)(1),
(2) Date: Dec. 14, 2020

(87) PCT Pub. No.: WO2019/244879
PCT Pub. Date: Dec. 26, 2019

(65) Prior Publication Data
US 2021/0261769 A1    Aug. 26, 2021

(30) Foreign Application Priority Data

Jun. 20, 2018    (JP) .............................. JP2018-117258

(51) Int. Cl.
| | |
|---|---|
| C08L 63/00 | (2006.01) |
| C08J 5/24 | (2006.01) |
| C08G 59/24 | (2006.01) |
| C08G 59/32 | (2006.01) |
| C08G 59/38 | (2006.01) |
| C08G 59/50 | (2006.01) |
| C08K 5/42 | (2006.01) |
| C08L 81/06 | (2006.01) |

(52) U.S. Cl.
CPC ............ *C08L 63/00* (2013.01); *C08G 59/245* (2013.01); *C08G 59/3227* (2013.01); *C08G 59/38* (2013.01); *C08G 59/5033* (2013.01); *C08J 5/243* (2021.05); *C08J 5/249* (2021.05); *C08K 5/42* (2013.01); *C08L 81/06* (2013.01); *C08L 2203/30* (2013.01)

(58) Field of Classification Search
CPC ..................................................... C08L 63/00
See application file for complete search history.

(56) References Cited

U.S. PATENT DOCUMENTS

| | | | |
|---|---|---|---|
| 6,399,199 B1 | 6/2002 | Fujino et al. | |
| 2013/0330478 A1 | 12/2013 | Ushiyama et al. | |
| 2018/0346710 A1 | 12/2018 | Yasunaga et al. | |

FOREIGN PATENT DOCUMENTS

| | | |
|---|---|---|
| JP | 2006-291094 A | 10/2006 |
| JP | 2009-167333 A | 7/2009 |
| JP | 2010-001446 A | 1/2010 |
| JP | 2010-254955 A | 11/2010 |
| JP | 2012-021086 A | 2/2012 |
| JP | 2012-046616 A | 3/2012 |
| JP | 2012-505267 A | 3/2012 |
| JP | 2016-074922 A | 5/2016 |
| JP | 2016-169381 A | 9/2016 |
| JP | 6118009 B1 | 4/2017 |
| WO | 2010/042369 A1 | 4/2010 |
| WO | 2017/094319 A1 | 6/2017 |

OTHER PUBLICATIONS

International Search Report issued in corresponding International Patent Application No. PCT/JP2019/024067, dated Aug. 27, 2019, with English translation.
Extended European Search Report issued in corresponding European Patent Application No. 19822909.8-1107, dated Feb. 8, 2022.
Japanese Notice of Reasons for Refusal issued in corresponding Japanese Patent Application No. 2018-117258, dated Jul. 5, 2022, with English translation.
Chinese First Office Action issued in corresponding Chinese Patent Application No. 201980029355.4, dated Oct. 8, 2022, with English translation.

*Primary Examiner* — Megan McCulley
(74) *Attorney, Agent, or Firm* — McDermott Will & Emery LLP

(57) ABSTRACT

An epoxy resin composition including components (A), (B), (C) and (D); wherein a content of the component (A) is 60 to 90 parts by mass, and a content of the component (B) is 10 to 40 parts by mass, with respect to epoxy resins; the epoxy resin composition has a characteristic that, when cured and formed into a cured product, the cured product has a glass transition temperature of 200° C. or higher; and a viscosity at 100° C. of the resin composition is 5 to 35 Pa·s, wherein Component (A) is an aromatic epoxy resin having at least 3 glycidyl groups in one molecule, Component (B) is an aromatic epoxy resin having two glycidyl groups in one molecule, Component (C) is an aromatic polysulfone resin having a reduced viscosity of 0.18 to 0.30 dl/g; and Component (D) is an aromatic amine compound.

9 Claims, No Drawings

EPOXY RESIN COMPOSITION, PREPREG AND MOLDED BODY

CROSS REFERENCE TO RELATED APPLICATIONS

This application is the U.S. National Phase under 35 U.S.C. § 371 of International Application No. PCT/JP2019/024067, filed on Jun. 18, 2019, which claims the benefit of Japanese Application No. 2018-117258, filed on Jun. 20, 2018, the entire contents of each are hereby incorporated by reference.

TECHNICAL FIELD

The present invention relates to an epoxy resin composition, a prepreg and a molded body.

BACKGROUND ART

Fiber reinforced plastics (sometimes abbreviated as FRP) using reinforcing fibers including carbon fibers have high specific strength and high specific elastic modulus, and are therefore used as materials for structures including aircraft.

A material for forming an FRP contains an epoxy resin and a curing agent.

However, while epoxy resins have high heat resistance and cured products thereof have high elastic modulus, there is a problem of low impact resistance (toughness) of epoxy resins.

In response to such a problem, Patent Document 1 discloses an epoxy resin composition for a fiber-reinforced composite material that has both sufficient heat resistance and toughness. The epoxy resin composition of Patent Document 1 contains 20 to 40 parts by weight of a thermoplastic resin and a curing agent with respect to 100 parts by weight of an epoxy resin component composed of 20 to 40% by weight of an epoxy resin having a biphenyl skeleton, 20 to 40% by weight of an epoxy resin having at least 3 epoxy groups in one molecule which is in a liquid form at 25° C., and 30 to 50% by weight of a bisphenol A type epoxy resin.

CITATION LIST

Patent Document

Patent Document 1 JP 2006-291094-A

SUMMARY OF THE INVENTION

Problems to be Solved by the Invention

However, molded bodies obtained from this type of epoxy resin composition do not necessarily have sufficient impact resistance, mechanical properties and solvent resistance.

The present invention has been made in view of such circumstances, and has an object of providing an epoxy resin composition capable of obtaining a molded article having high impact resistance, mechanical properties and solvent resistance, a prepreg, and a molded article.

It should be noted that in the present specification, the term "mechanical properties" means strength and elastic modulus.

Means to Solve the Problems

As a result of intensive studies by the inventors of the present invention, it was found that the impact resistance of the obtained molded article improves by the addition of an aromatic polysulfone resin to an epoxy resin.

However, as a result of further intensive studies by the inventors of the present invention, when an epoxy resin composition containing an epoxy resin and an aromatic polysulfone resin forms a molded article, it was found that the mechanical properties and solvent resistance of the molded article are not necessarily sufficient.

Accordingly, the inventors of the present invention have found that an epoxy resin composition containing an aromatic polysulfone resin of the following aspects also improves the mechanical properties and solvent resistance of the obtained molded article, thereby completing the present invention.

One aspect of the present invention provides an epoxy resin composition including the following component (A), component (B), component (C) and component (D), wherein a content of the component (A) is 60 parts by mass or more and 90 parts by mass or less with respect to a total content of 100 parts by mass of epoxy resins contained in the epoxy resin composition, a content of the component (B) is 10 parts by mass or more and 40 parts by mass or less with respect to a total content of 100 parts by mass of the epoxy resins contained in the epoxy resin composition, a glass transition temperature of a cured product of the epoxy resin composition is 200° C. or higher, and a viscosity at 100° C. of the resin composition composed of the component (A), the component (B), the component (C) and the component (D) is 5 Pa·s or more and 35 Pa·s or less, Component (A): an aromatic epoxy resin having 3 or more glycidyl groups in one molecule;

Component (B): an aromatic epoxy resin having two glycidyl groups in one molecule;

Component (C): an aromatic polysulfone resin having a reduced viscosity of 0.18 dl/g or more and 0.30 dl/g or less; and Component (D): an aromatic amine compound.

In one aspect of the present invention, it may be configured so that an epoxy equivalent of the component (A) is 125 g/eq or less.

In one aspect of the present invention, it may be configured so that the content of a phenolic hydroxyl group in the component (C) is 100 μmol/g or more and 350 μmol/g or less with respect to the total mass of the component (C).

In one aspect of the present invention, it may be configured so that the component (D) is diaminodiphenyl sulfone or a derivative thereof.

In one aspect of the present invention, it may be configured so that the component (D) includes the following component (D-1).

Component (D-1): 4,4'-diaminodiphenyl sulfone

In one aspect of the present invention, it may be configured so that the component (D) further includes the following component (D-2), and that a mass content ratio (D-2)/(D-1) of the component (D-1) and the component (D-2) is less than 1.

Component (D-2): 3,3'-diaminodiphenyl sulfone

In one aspect of the present invention, it may be configured so that the content of a trimer in the component (A) is 3% by mass or less with respect to the total mass of the component (A).

One aspect of the present invention provides a prepreg in which a reinforcing fiber is impregnated with the above epoxy resin composition.

In one aspect of the present invention, it may be configured so that the reinforcing fiber is a carbon fiber.

One aspect of the present invention provides a molded article using a cured product of the above prepreg as a forming material.

That is, the present invention includes the following aspects.

[1] An epoxy resin composition including:
the following component (A), component (B), component (C) and component (D); wherein
a content of the aforementioned component (A) is 60 parts by mass or more and 90 parts by mass or less with respect to a total content of 100 parts by mass of epoxy resins contained in the aforementioned epoxy resin composition;
a content of the aforementioned component (B) is 10 parts by mass or more and 40 parts by mass or less with respect to a total content of 100 parts by mass of the epoxy resins contained in the aforementioned epoxy resin composition;
the aforementioned epoxy resin composition has a characteristic that, when cured and formed into a cured product, the aforementioned cured product has a glass transition temperature of 200° C. or higher; and
a viscosity at 100° C. of the resin composition including the aforementioned component (A), the aforementioned component (B), the aforementioned component (C) and the aforementioned component (D) is 5 Pa·s or more and 35 Pa·s or less, Component (A): an aromatic epoxy resin having at least 3 glycidyl groups in one molecule;
Component (B): an aromatic epoxy resin having two glycidyl groups in one molecule;
Component (C): an aromatic polysulfone resin having a reduced viscosity of 0.18 dl/g or more and 0.30 dl/g or less; and
Component (D): an aromatic amine compound.

[2] The epoxy resin composition according to [1], wherein an epoxy equivalent of the aforementioned component (A) is 125 g/eq or less.

[3] The epoxy resin composition according to [1] or [2], wherein a content of a phenolic hydroxyl group in the aforementioned component (C) is 100 μmol/g or more and 350 μmol/g or less with respect to a mass of the aforementioned component (C).

[4] The epoxy resin composition according to any one of [1] to [3], wherein the aforementioned component (D) is diaminodiphenyl sulfone or a derivative thereof.

[5] The epoxy resin composition according to [4], wherein the aforementioned component (D) includes the following component (D-1).
Component (D-1): 4,4'-diaminodiphenyl sulfone

[6] The epoxy resin composition according to [5], wherein the aforementioned component (D) further includes the following component (D-2), and
a mass content ratio (D-2)/(D-1) of the aforementioned component (D-1) and the aforementioned component (D-2) is less than 1.
Component (D-2): 3,3'-diaminodiphenyl sulfone

[7] The epoxy resin composition according to any one of [1] to [6], wherein a content of a trimer in the aforementioned component (A) is 3% by mass or less with respect to a total mass of the aforementioned component (A).

[8] A prepreg in which a reinforcing fiber is impregnated with the epoxy resin composition according to any one of [1] to [7].

[9] The prepreg according to [8], wherein the aforementioned reinforcing fiber is a carbon fiber.

[10] A molded article formed of a cured product of the prepreg according to [8] or [9].

Effects of the Invention

According to one aspect of the present invention, there are provided an epoxy resin composition capable of obtaining a molded article having high impact resistance, mechanical properties and solvent resistance, a prepreg, and a molded article.

EMBODIMENTS FOR CARRYING OUT THE INVENTION

<Epoxy Resin Composition>
An epoxy resin composition of the present embodiment contains at least the following component (A), component (B), component (C) and component (D),
Component (A): an aromatic epoxy resin having at least 3 glycidyl groups in one molecule;
Component (B): an aromatic epoxy resin having two glycidyl groups in one molecule;
Component (C): an aromatic polysulfone resin having a reduced viscosity of 0.18 dl/g or more and 0.30 dl/g or less; and
Component (D): an aromatic amine compound.

The epoxy resin composition of the present embodiment is used as a material for forming a molded article described later.

Details of each component will be described below.

Component (A)

The component (A) according to the present embodiment is an aromatic epoxy resin having at least three glycidyl groups in one molecule, and examples thereof include a glycidyl amine type epoxy resin, a phenol novolac type epoxy resin, a cresol novolac type epoxy resin, and a glycidyl ether type epoxy resin. As the component (A), a glycidyl amine type epoxy resin is particularly preferable, and preferred examples thereof include a resin containing a monomer such as tetraglycidyl diaminodiphenylmethane, triglycidyl aminophenol and triglycidyl aminocresol and a polymer thereof. One of these may be used alone or two or more types thereof may be used in combination.

In one aspect, a resin containing tetraglycidyl diaminodiphenylmethane and a polymer thereof is preferable.

An epoxy equivalent of the component (A) is preferably 125 g/eq or less, more preferably 120 g/eq or less, and still more preferably 118 g/eq or less.

Further, the epoxy equivalent of the component (A) may be 95 g/eq or more.

In one aspect, the epoxy equivalent of the component (A) is preferably 95 g/eq or more and 125 g/eq or less, more preferably 95 g/eq or more and 120 g/eq or less, and still more preferably 95 g/eq or more and 118 g/eq or less.

When the epoxy equivalent of the component (A) is 125 g/eq or less, the crosslinking density of the molded article described later tends to be sufficiently high, and the elastic modulus of the molded article tends to be high. Further, when the epoxy equivalent of the component (A) is 125 g/eq or less, the viscosity of the epoxy resin composition can be easily suppressed to a low level, and handling becomes easy.

In the present embodiment, as the epoxy equivalent of the component (A), a value measured by the hydrochloric acid-dioxane method in accordance with JIS K7236 is adopted.

In one aspect, the component (A) may contain a trimer of the above monomer, and the content of the trimer contained in the component (A) is preferably 3% by mass or less with respect to the total mass of the component (A). Further, the content of the trimer in the component (A) may be 0% by mass or more with respect to the total mass of the component (A).

In one aspect, the content of the trimer in the component (A) is preferably 0% by mass or more and 3% by mass or less with respect to the total mass of the component (A).

When the content of the trimer in the component (A) is 3% by mass or less, it is preferable because the viscosity of the component (A) becomes low and handling becomes easy.

In the present embodiment, the content of the trifler contained in the component (A) is calculated based on the measurement result of liquid chromatography (may be abbreviated as LC) analysis under the following conditions. More specifically, in the LC analysis, the sum of the peak areas detected during the retention time of 30 minutes to 35 minutes is used as the content of the trimer. The ratio of the sum of the peak areas detected during the retention time of 30 minutes to 35 minutes with respect to the sum of the peak areas detected during the retention time of 0 minutes to 35 minutes is adopted as the content of the trimer in the component (A).

(Conditions)

Sample: 5 µL of a solution prepared by dissolving 1 mg of a sample in 1 ml of acetonitrile is injected Apparatus: liquid chromatograph Nexera XR manufactured by Shimadzu Corporation Column: Sumipax ODS A-212 manufactured by Sumika Chemical Analysis Service, Ltd. Center (inner diameter: 6 mm, length: 150 m, film thickness: 5 µm)

Column temperature: 40° C.

Component (B)

The component (B) according to the present embodiment is an aromatic epoxy resin having two glycidyl groups in one molecule, and examples thereof include a bisphenol type epoxy resin containing a monomer, such as a diglycidyl ether of bisphenol A, a diglycidyl ether of bisphenol F and a diglycidyl ether of bisphenol S, and a polymer thereof. Among these, a resin containing a diglycidyl ether of bisphenol A and a polymer thereof is preferably used. One of these may be used alone or two or more types thereof may be used in combination.

Component (C)

The aromatic polysulfone resin as the component (C) according to the present embodiment is typically a resin having a repeating unit containing a divalent aromatic group (a residue obtained by removing, from an aromatic compound, two hydrogen atoms bonded to its aromatic ring), a sulfonyl group (—$SO_2$—), and an oxygen atom.

The aromatic polysulfone resin preferably has a repeating unit represented by the following formula (1) from the viewpoint of heat resistance and chemical resistance of the aromatic polysulfone resin. Furthermore, the aromatic polysulfone resin may have one or more types of other repeating units such as a repeating unit represented by the following formula (2) and a repeating unit represented by the following formula (3).

Hereafter, the "repeating unit represented by the following formula (1)" may be referred to as "repeating unit (1)". Further, the "repeating unit represented by the following formula (2)" may be referred to as "repeating unit (2)". Moreover, the "repeating unit represented by the following formula (3)" may be referred to as "repeating unit (3)".

-$Ph^1$-$SO_2$-$Ph^2$—O—     (1)

$Ph^1$ and $Ph^2$ each independently represent a phenylene group. Hydrogen atoms in the aforementioned phenylene group may be each independently substituted with an alkyl group, an aryl group or a halogen atom.

-$Ph^3$-R-$Ph^4$O—     (2)

$Ph^3$ and $Ph^4$ each independently represent a phenylene group. Hydrogen atoms in the aforementioned phenylene group may be each independently substituted with an alkyl group, an aryl group or a halogen atom. R represents an alkylidene group, an oxygen atom or a sulfur atom.

-$(Ph^5)_n$—O—     (3)

$Ph^5$ represents a phenylene group. Hydrogen atoms in the aforementioned phenylene group may be each independently substituted with an alkyl group, an aryl group or a halogen atom. n represents an integer of 1 to 3. When n is 2 or more, a plurality of $Ph^5$ groups may be the same as or different from each other.

The phenylene group represented by any one of $Ph^1$ to $Ph^5$ groups may be a p-phenylene group, an m-phenylene group, or an o-phenylene group, but it is preferably a p-phenylene group.

The alkyl group which may substitute a hydrogen atom in the aforementioned phenylene group is preferably an alkyl group having 1 to 10 carbon atoms, and examples thereof include a methyl group, an ethyl group, an n-propyl group, an isopropyl group, an n-butyl group, an isobutyl group, an s-butyl group, a t-butyl group, an n-hexyl group, a 2-ethylhexyl group, an n-octyl group and an n-decyl group.

The aryl group which may substitute a hydrogen atom in the aforementioned phenylene group is preferably an aryl group having 6 to 20 carbon atoms, and examples thereof include a phenyl group, an o-tolyl group, an m-tolyl group, a p-tolyl group, a 1-naphthyl group and a 2-naphthyl group.

Examples of the halogen atom which may substitute a hydrogen atom in the aforementioned phenylene group include a fluorine atom, a chlorine atom, a bromine atom and an iodine atom.

In the case where a hydrogen atom in the aforementioned phenylene group is substituted with these groups, the number thereof is, each independently, for example, 2 or less, and preferably 1 for each of the aforementioned phenylene groups.

The alkylidene group represented by R is preferably an alkylidene group having 1 to 5 carbon atoms, and examples thereof include a methylene group, an ethylidene group, an isopropylidene group and a 1-butylidene group.

The aromatic polysulfone resin preferably includes the repeating unit (1) in an amount of 50 mol % or more and 100 mol % or less, and more preferably 80 mol % or more and 100 mol % or less, with respect to the total number of moles of all the repeating units constituting the aromatic polysulfone resin, and still more preferably substantially includes only the repeating unit (1) as a repeating unit. It should be noted that the aromatic polysulfone resin may have two or more types of repeating units (1) to (3), independently of each other.

The aromatic polysulfone produced by the method described later has a halogen atom or a phenolic hydroxyl group at its terminal. The content of the phenolic hydroxyl group in the aromatic polysulfone resin is preferably 100 µmol/g or more and 350 µmol/g or less with respect to the mass of the aromatic polysulfone resin. In one aspect, the content of the phenolic hydroxyl group in the aromatic polysulfone resin may be 100 µmol/g or more and 200 µmol/g or less.

When the content of the phenolic hydroxyl group in the aromatic polysulfone resin is 100 µmol/g or more, the amount of the phenolic hydroxyl group that reacts with the glycidyl group or the curing agent contained in the component (A) and the component (B) during curing of the epoxy resin composition is sufficiently large. As a result, the impact resistance and solvent resistance of the molded article described later tend to increase.

When the content of the phenolic hydroxyl group in the aromatic polysulfone resin is 350 mol/g or less, it is considered that water absorption due to the phenolic hydroxyl group is unlikely to occur in the molded article.

In the present embodiment, a value obtained in the following manner is adopted as the content of the phenolic hydroxyl group in the aromatic polysulfone resin. First, a predetermined amount of aromatic polysulfone resin is dissolved in dimethylformamide, and then an excessive amount of p-toluenesulfonic acid is added thereto. Then, using a potentiometric titrator, titration is performed with a 0.05 mol/l potassium methoxide/toluene methanol solution, and after neutralizing the residual p-toluenesulfonic acid, the phenolic hydroxyl group is neutralized. At this time, a value obtained by dividing the amount (moles) of potassium methoxide required for neutralization of the phenolic hydroxyl group by the above-mentioned predetermined amount (g) of the aromatic polysulfone resin is used as the content of the phenolic hydroxyl group in the aromatic polysulfone resin.

The aromatic polysulfone resin can be produced by polycondensation of a dihalogenosulfone compound and a dihydroxy compound corresponding to the repeating units constituting the aromatic polysulfone resin. For example, a resin having the repeating unit (1) can be produced by using a compound represented by the following formula (4) as a dihalogenosulfone compound and using a compound represented by the following formula (5) as a dihydroxy compound. It should be noted that in the following description, the "compound represented by the following formula (4)" may be referred to as "compound (4)". Further, the "compound represented by the following formula (5)" may be referred to as "compound (5)".

Moreover, a resin having the repeating unit (1) and the repeating unit (2) can be produced by using the compound (4) as a dihalogenosulfone compound and using a compound represented by the following formula (6) as a dihydroxy compound. It should be noted that in the following description, the "compound represented by the following formula (6)" may be referred to as "compound (6)".

Furthermore, a resin having the repeating unit (1) and the repeating unit (3) can be produced by using the compound (4) as a dihalogenosulfone compound and using a compound represented by the following formula (7) as a dihydroxy compound. It should be noted that in the following description, the "compound represented by the following formula (7)" may be referred to as "compound (7)".

$X^1$ and $X^2$ each independently represent a halogen atom. $Ph^1$ and $Ph^2$ are the same as defined above.

$Ph^1$ and $Ph^2$ are the same as defined above.

$Ph^3$, $Ph^4$ and R are the same as defined above.

Examples of the halogen atom represented by $X^1$ and $X^2$ include a fluorine atom, a chlorine atom, a bromine atom and an iodine atom.

$Ph^5$ and n are the same as defined above.

The aforementioned polycondensation is preferably carried out in a solvent using an alkali metal salt of carbonic acid. The alkali metal salt of carbonic acid may be an alkali carbonate which is a normal salt, an alkali bicarbonate which is an acid salt (also referred to as an alkali hydrogen carbonate), or a mixture of both.

As the alkali carbonate, sodium carbonate or potassium carbonate is preferably used.

As the alkali bicarbonate, sodium bicarbonate or potassium bicarbonate is preferably used.

As the solvent, polar organic solvents such as dimethyl sulfoxide, 1-methyl-2-pyrrolidone, sulfolane (also referred to as 1,1-dioxothiolane), 1,3-dimethyl-2-imidazolidinone, 1,3-diethyl-2-imidazolidinone, dimethyl sulfone, diethyl sulfone, diisopropyl sulfone and diphenyl sulfone are preferably used.

The reduced viscosity of the aromatic polysulfone resin is 0.18 dl/g or more and 0.30 dL/g or less, and preferably 0.20 dl/g or more and 0.28 dL/g or less.

In one aspect, the reduced viscosity of the aromatic polysulfone resin may be 0.20 dl/g or more and 0.27 dL/g or less.

If the reduced viscosity of the aromatic polysulfone resin is 0.18 dl/g or more, the heat resistance and impact resistance of the molded article obtained from the epoxy resin composition easily improve, depending on other components contained in the epoxy resin composition. When the reduced viscosity of the aromatic polysulfone resin is 0.30 dL/g or less, the viscosity of the epoxy resin composition does not become too high, and the temperature required for the molding process does not get too high, depending on other components contained in the epoxy resin composition.

Here, it is generally known that the higher the viscosity of the resin composition, the more voids tend to occur in the molded article obtained by molding the resin composition.

According to the studies by the inventors of the present invention, it was found that the number of voids in the molded article of a resin composition using an aromatic polysulfone resin having a reduced viscosity in the range of 0.18 dl/g or more and 0.30 dL/g or less was smaller than that of a resin composition using an aromatic polysulfone resin having a reduced viscosity outside the range of 0.18 dl/g or more and 0.30 dL/g or less, even though the resin compositions composed of the component (A), the component (B), the component (C) and the component (D) have the same viscosity at 100° C. It is known that the smaller the number of voids in the molded article, the higher the mechanical properties of the molded article. Further, it is considered that the smaller the number of voids in the molded article, the higher the solvent resistance of the molded article. It is considered that this is because as the number of voids in the molded article decreases, the solvent is less likely to penetrate into the molded article and the resin is less likely to deteriorate.

It should be noted that in the present specification, the term "mechanical properties" means strength and elastic modulus.

The strength and elastic modulus can be measured with a tensile tester, bending tester, and the like.

In the present embodiment, a value obtained as follows is adopted as the reduced viscosity of the aromatic polysulfone resin. 1 g of an aromatic polysulfone resin is dissolved in N,N-dimethylformamide to adjust the volume to 1 dl, and the viscosity ($\eta$) of this solution is measured at 25° C. using an Ostwald type viscosity tube. Further, the viscosity ($\eta_0$) of N,N-dimethylformamide as a solvent is measured at 25° C. using an Ostwald type viscosity tube. Since the concentration of the above solution is 1 g/dl, the value of the specific viscosity (($\eta-\eta_0$)/$\eta_0$) will be the value of the reduced viscosity in the unit of dl/g.

In the above-described polycondensation, if a side reaction does not occur, the closer the molar ratio of the dihalogenosulfone compound and the dihydroxy compound is to 1:1, the more likely the degree of polymerization of the obtained aromatic polysulfone resin increases, and the more likely the reduced viscosity increases. In addition to these conditions, examples of conditions in which the degree of polymerization of the aromatic polysulfone resin is likely to increase and the reduced viscosity is likely to increase include conditions in which the amount of the alkali metal salt of carbonic acid used is larger, conditions in which the polycondensation temperature is higher, and conditions in which the polycondensation time is longer.

However, in fact, side reactions such as a substitution reaction of a halogeno group to a hydroxyl group or depolymerization occur by the alkali hydroxide or the like which is produced as a by-product. Due to these side reactions, the degree of polymerization of the obtained aromatic polysulfone resin is easily lowered, and the reduced viscosity is easily lowered. Therefore, in consideration of the degree of these side reactions, it is preferable to adjust the molar ratio of the dihalogenosulfone compound and the dihydroxy compound, the amount of the alkali metal salt of carbonic acid used, the polycondensation temperature and the polycondensation time, so that an aromatic polysulfone resin having a desired reduced viscosity is obtained.

Component (D)

Examples of the aromatic amine compound as the component (D) according to the present embodiment include compounds that are usually used as curing agents for epoxy resins. The aromatic amine compound is preferably diaminodiphenylmethane, diaminodiphenylsulfone or a derivative thereof. A single type of aromatic amine compound may be used alone or two or more types thereof may be used in combination.

In the present specification, the term "derivative" refers to a compound in which a small part of the compound is replaced with another atom or atomic group without changing the basic skeleton.

The aromatic amine compound preferably contains at least the following component (D-1). Furthermore, the component (D) may contain the following component (D-2).

Component (D-1): 4,4'-diaminodiphenyl sulfone
Component (D-2): 3,3'-diaminodiphenyl sulfone A mass content ratio (D-2)/(D-1) of the component (D-1) and the component (D-2) is preferably less than 1.

[Content]

The content of the component (A) in the epoxy resin composition of the present embodiment is 60 parts by mass or more and 90 parts by mass or less with respect to the total content of 100 parts by mass of the epoxy resins contained in the epoxy resin composition, and is preferably 65 parts by mass or more and 85 parts by mass or less, and more preferably 70 parts by mass or more and 80 parts by mass or less. It should be noted that the expression "epoxy resins contained in the epoxy resin composition" means the component (A), the component (B), and an epoxy resin other than the component (A) and the component (B) which is contained if desired.

When the content of the component (A) is 60 parts by mass or more with respect to the total content of 100 parts by mass of the epoxy resins contained in the epoxy resin composition, the crosslinking density of the molded article described later tends to be sufficiently high. As a result, an epoxy resin composition having high heat resistance is easily obtained.

When the content of the component (A) is 90 parts by mass or less with respect to the total content of 100 parts by mass of the epoxy resins contained in the epoxy resin composition, the elastic modulus of the molded article tends to be sufficiently high while suppressing the viscosity of the epoxy resin composition to a low level.

The content of the component (B) in the epoxy resin composition of the present embodiment is 10 parts by mass or more and 40 parts by mass or less with respect to the total content of 100 parts by mass of the epoxy resins contained in the epoxy resin composition, and is preferably 15 parts by mass or more and 35 parts by mass or less, and more preferably 20 parts by mass or more and 30 parts by mass or less.

When the content of the component (B) is 10 parts by mass or more with respect to the total content of 100 parts by mass of the epoxy resins contained in the epoxy resin composition, it is easy to achieve both the impact resistance and the elastic modulus of the molded article described later. Further, when the content of the component (B) is 10 parts by mass or more, the cost of the epoxy resin composition can be suppressed.

When the content of the component (B) is 40 parts by mass or less with respect to the total content of 100 parts by mass of the epoxy resins contained in the epoxy resin composition, the crosslinking density of the molded article described later tends to be sufficiently high. As a result, a molded article having a high elastic modulus is easily obtained.

The content of the aromatic polysulfone resin serving as the component (C) in the epoxy resin composition of the present embodiment is adjusted to such a range that the viscosity of a resin composition composed of the component (A), the component (B), the component (C), and the component (D) described later at 100° C. is 5 Pa·s or more and 35 Pa·s or less, and preferably 8 Pa·s or more and 215 Pa·s or less.

The content of the component (D) in the epoxy resin composition of the present embodiment is 20 parts by mass or more and 50 parts by mass or less, and preferably 20 parts by mass or more and 45 parts by mass or less with respect to the total content of 100 parts by mass of the epoxy resins contained in the epoxy resin composition.

[Other Components]

The epoxy resin composition of the present embodiment may contain at least one of other components, such as a filler, an additive other than the aromatic amine compound, and a resin other than the component (A), the component (B) and the component (C); or a solvent, within a range in which the effects of the present invention are exhibited. Hereinafter, the resin other than the component (A), the component (B) and the component (C) may be referred to as the "other resin".

The filler may be a fibrous filler, a plate-like filler, or a particulate filler. Further, the filler may be an inorganic filler or an organic filler.

Examples of the fibrous inorganic filler include glass fibers; carbon fibers such as polyacrylonitrile (PAN)-based carbon fibers and pitch-based carbon fibers; ceramic fibers such as silica fibers, alumina fibers and silica alumina fibers; and metal fibers such as stainless steel fibers. In addition, whiskers such as potassium titanate whiskers, barium titanate whiskers, wollastonite whiskers, aluminum borate whiskers, silicon nitride whiskers, and silicon carbide whiskers can also be mentioned.

Examples of the fibrous organic filler include ultra high molecular weight polyethylene fibers having a molecular weight of 1,000,000 or more, polyester fibers, aramid fibers, and polyparaphenylene benzobisoxazole fibers.

Examples of the plate-like inorganic filler include talc, mica, graphite, wollastonite, glass flakes, barium sulfate and calcium carbonate. The mica may be muscovite, phlogopite, fluorophlogopite or tetrasilicic mica.

Examples of the particulate inorganic filler include silica, alumina, titanium oxide, glass beads, glass balloons, boron nitride, silicon carbide and calcium carbonate. In addition, carbon black can be mentioned as an example of a particulate organic filler.

The content of the filler is preferably, for example, from 0 to 100 parts by mass with respect to the total content of 100 parts by mass of the epoxy resins contained in the epoxy resin composition of the present embodiment.

Examples of the additive include antioxidants, thermal stabilizers, ultraviolet absorbers, antistatic agents, surfactants, flame retardants and colorants.

The content of the additive is preferably, for example, from 0 to 20 parts by mass with respect to the total content of 100 parts by mass of the epoxy resins contained in the epoxy resin composition of the present embodiment.

Examples of the other resin include thermoplastic resins other than the aromatic polysulfone resins such as polypropylenes, polyamides, polyesters, polyphenylene sulfides, polyvinyl formals, polyether ketones, polycarbonate, polyphenylene ethers, and polyetherimides; and thermosetting resins such as phenol resins, epoxy resins other than the component (A) and the component (B), polyimide resins, cyanate resins, bismaleimide resins, and benzoxazine resins.

The content of the other resin is preferably, for example, from 0 to 20 parts by mass with respect to the total content of 100 parts by mass of the epoxy resins contained in the epoxy resin composition of the present embodiment.

Although the solvent is not particularly limited, usually, a solvent used in the epoxy resin composition for molding a molded article is preferable. Examples of such a solvent include acetone, methyl ethyl ketone, methyl isobutyl ketone, methanol, ethanol, isopropyl alcohol, dimethyl sulfoxide, N,N-dimethylformamide, N-methylpyrrolidone, and N,N-dimethylacetamide.

Further, the epoxy resin composition of the present embodiment may contain rubber particles within a range in which the effects of the present invention are exhibited. Examples of the rubber particles include polybutadiene, polyisoprene, polychloroprene, styrene-butadiene copolymers, acrylonitrile-butadiene copolymers, synthetic rubbers such as silicone rubbers, natural rubbers, and core shell rubbers.

The content of the rubber component is preferably 0 parts by mass or more and 50 parts by mass or less, and more preferably 0 parts by mass or more and 25 parts by mass or less with respect to the total content of 100 parts by mass of the epoxy resins contained in the epoxy resin composition of the present embodiment.

[Epoxy Resin Composition]

The glass transition temperature of a cured product of the epoxy resin composition of the present embodiment is 200° C. or higher, preferably 205° C. or higher, and more preferably 210° C. or higher.

In one aspect, the epoxy resin composition of the present embodiment has a characteristic that when it is cured and formed into a cured product, the glass transition temperature is 200° C. or higher and 230° C. or lower, preferably 205° C. or higher and 220° C. or lower, more preferably 210° C. or higher and 220° C. or lower, and particularly preferably 211° C. or higher and 215° C. or lower.

When the epoxy resin composition is cured, if the glass transition temperature of the cured product is 200° C. or higher, the epoxy resin composition can be used in applications where excellent mechanical properties are required in a high temperature environment of 200° C. or higher.

In the present embodiment, a value obtained based on the peak of tan δ measured using a dynamic viscoelasticity measuring device ("Q800" manufactured by TA Instruments, Inc.) under the following conditions is adopted as the glass transition temperature of the cured product of the epoxy resin composition.

(Conditions)
Measurement mode: tension mode
Amplitude: 20 μm
Frequency: 20 Hz
Rate of temperature increase: 5° C./min In the epoxy resin composition of the present embodiment, the viscosity of the resin composition composed of the component (A), the component (B), the component (C) and the component (D) at 100° C. is 5 Pa·s or more and 35 Pa·s or less, preferably 7 Pa·s or more and 30 Pa·s or less, and more preferably 8 Pa·s or more and 21 Pa·s or less.

In another aspect, when a resin composition is prepared from only the component (A), the component (B), the component (C) and the component (D) which constitute the epoxy resin composition of the present embodiment, the viscosity of the resin composition at 100° C. is 5 Pa·s or more and 35 Pa·s or less, preferably 7 Pa·s or more and 30 Pa·s or less, and more preferably 8 Pa·s or more and 21 Pa·s or less.

When the viscosity of the resin composition at 100° C. is 5 Pa·s or more, it is easy to impregnate a reinforcing fiber with the epoxy resin composition in the production of a prepreg described later.

When the viscosity of the resin composition at 100° C. is 35 Pa·s or less, handling is easy when molding the resin composition. In addition, voids are unlikely to remain in the molded body obtained by curing the resin composition.

In the present embodiment, a value obtained from a viscosity curve obtained by using a parallel plate with a dynamic viscoelasticity measuring device (CVO model Rheometer manufactured by Bohlin Instruments Ltd.) under the following conditions is adopted as the viscosity of the above resin composition at 100° C.

(Conditions)
Measurement range: room temperature (about 20° C.) to 120° C.
Rate of temperature increase: 2° C./min
Strain: 10%
Frequency: 1 Hz
Plate distance: 1 mm The epoxy resin composition of the present embodiment has high heat resistance and impact resistance. Further, the molded body formed from the above-mentioned epoxy resin composition has high impact resistance, mechanical properties and solvent resistance.

Usually, although thermosetting resins such as epoxy resins have high heat resistance, and the cured products thereof have high elastic modulus, thermosetting resins have low impact resistance, which is a problem. Since the impact resistance of the thermosetting resins is low, it is considered that cracks are likely to propagate between a resin layer and a reinforcing fiber layer, particularly in a molded body in which a plurality of prepregs having a thermosetting resin as a matrix resin are laminated. As a result, it is considered that the impact resistance of the molded body tends to be low.

In response to such a problem of low impact resistance of the molded body, the inventors of the present invention have focused on aromatic polysulfones which are thermoplastic resins. As a result of intensive studies by the inventors of the present invention, it was found that in a molded body formed from the above-mentioned epoxy resin composition, a resin layer easily forms a sea-island structure in which the epoxy resin serves as the sea and the aromatic polysulfone resin serves as an island. In the resin layer having such a sea-island structure, it is considered that the propagation of cracks can be suppressed in a region of the aromatic polysulfone resin.

It should be noted that the molded body formed from the epoxy resin composition described above is not limited to the case of forming a sea-island structure. As a result of intensive studies by the inventors of the present invention, it was found that the impact resistance of the epoxy resin composition improves even when the molded body has a uniform structure. It is considered that this increases the impact resistance of the molded body.

In the present embodiment, the impact resistance of the epoxy resin composition can be evaluated by measuring a fracture toughness value of the cured product obtained by curing the epoxy resin composition in accordance with ASTM D5045-99.

Further, it is known that epoxy resins usually have poor adhesion to reinforcing fibers. In the present embodiment, the aromatic polysulfone resin improves the adhesion between the epoxy resin and the reinforcing fiber.

Moreover, as described above, it was found that the molded body formed from the epoxy resin composition of the present embodiment has less voids than the molded body formed from a conventional resin composition having the same level of viscosity at 100° C. It can be said that the smaller the number of voids in the molded body, the higher the mechanical properties and the solvent resistance of the molded body.

From the above, it is considered that the molded body formed from the above-mentioned epoxy resin composition has high impact resistance, mechanical properties, and solvent resistance.

[Method for Producing Epoxy Resin Composition]

A method for producing the epoxy resin composition of the present embodiment is not particularly limited, and the component (A), the component (B), the component (C), the component (D) and, if desired, other components only need to be mixed. In the present embodiment, the component (A), the component (B), and the component (C) may be mixed in advance, and the component (D) may be mixed with this mixture. When mixing each component, each component may be heated within a range in which the effects of the present invention are exhibited.

<Prepreg>

A prepreg of the present embodiment is a sheet-shaped base material in which a reinforcing fiber is impregnated with the epoxy resin composition described above.

From the viewpoint of strength, the reinforcing fiber according to the present embodiment is preferably at least one selected from the group consisting of a carbon fiber, a glass fiber, a boron fiber and an aramid fiber, and more preferably a carbon fiber. These reinforcing fibers may be woven fabrics or nonwoven fabrics.

The prepreg of the present embodiment preferably has a fiber volume content of 40 to 70%.

[Method for Producing Prepreg]

A method for producing the prepreg of the present embodiment is not particularly limited, and the reinforcing fiber only needs to be impregnated with the epoxy resin composition described above.

As a method for impregnating the reinforcing fiber with the epoxy resin composition, a wet method, a hot melt method (dry method) and the like can be mentioned.

The wet method is a method for impregnating a reinforcing fiber with a resin by immersing the reinforcing fiber in the resin, and then pulling up the reinforcing fiber, and evaporating the solvent from the reinforcing fiber using an oven or the like.

The hot melt method is a method for directly impregnating a reinforcing fiber with a resin whose viscosity has been lowered by heating. Further, another form of the hot melt method is a method in which a film coated with a resin is prepared in advance on release paper or the like, and then the film is superimposed from both sides or one side of the reinforcing fiber, followed by heating and pressurizing, thereby impregnating the reinforcing fiber with the resin.

After impregnating the reinforcing fiber with the epoxy resin composition in this manner, the prepreg can be produced by semi-curing the impregnated epoxy resin composition, for example, by heating to 120 to 150° C.

In the present specification, the term "semi-curing" refers to a state in which the viscosity or hardness of the resin has increased until a certain shape can be maintained, and the viscosity or hardness can increase from this state to a state in which the viscosity or hardness can further increase.

According to the present embodiment, it is possible to obtain a prepreg capable of obtaining a molded body having high impact resistance, mechanical properties and solvent resistance.

<Molded Body>

A molded body of the present embodiment uses a cured product of the above prepreg as a forming material.

The molded body of the present embodiment has high impact resistance, mechanical properties and solvent resistance, and can therefore be suitably used for applications such as automobiles and aircraft.

The molded body of the present embodiment is configured by laminating a plurality of the above prepregs. More specifically, a molded body can be obtained by superimposing a plurality of prepregs produced by the above method and heat curing and molding them using an autoclave or a heat press machine.

As a pattern for laminating the prepregs, a lamination method in which arrangement directions of the reinforcing fibers contained in the prepregs are aligned (that is, the angle formed by the orientation directions of the layers is 0°) or a method in which the prepregs are laminated while shifting them at an arbitrary angle can be mentioned. For example, when the orientation directions of the layers are shifted by 45°, the angles formed by the orientation directions of the layers are: 0°/45°/90°/135°/180°/225°/270°/315°/360° (0°). It should be noted that the phrase "shifted at an arbitrary angle" means that a relative angle in the direction of fibers contained in the two layers of prepreg to be laminated is changed. The arbitrary angle can be appropriately set depending on the application of the molded body.

According to the present embodiment, it is possible to obtain a molded body in which the generation of voids is suppressed and preferably voids do not exist. Therefore, a molded body having high mechanical properties and solvent resistance can be obtained.

In one aspect, the epoxy resin composition according to an embodiment of the present invention is an epoxy resin composition including:

a component (A), a component (B), a component (C) and a component (D); wherein the aforementioned component (A) contains tetraglycidyl diaminodiphenylmethane and a polymer thereof, an epoxy equivalent of the aforementioned component (A) is 95 g/eq or more and 118 g/eq or less, a content of a trimer in the aforementioned component (A) is 0% by mass or more and 3% by mass or less with respect to a total mass of the aforementioned component (A);

the aforementioned component (B) is bisphenol A diglycidyl ether;

the aforementioned component (C) is an aromatic polysulfone resin obtained by polycondensation of bis(4-hydroxyphenyl) sulfone and bis(4-chlorophenyl) sulfone, the aforementioned aromatic polysulfone resin has a reduced viscosity of 0.20 dl/g or more and 0.27 dL/g or less, a content of a phenolic hydroxyl group in the aforementioned aromatic polysulfone resin is 100 μmol/g or more and 200 μmol/g or less;

the aforementioned component (D) is bis(4-aminophenyl) sulfone;

a content of the aforementioned component (A) is 70 parts by mass or more and 80 parts by mass or less with respect to a total content of 100 parts by mass of epoxy resins contained in the aforementioned epoxy resin composition;

a content of the aforementioned component (B) is 20 parts by mass or more and 30 parts by mass or less with respect to a total content of 100 parts by mass of the epoxy resins contained in the aforementioned epoxy resin composition;

a content of the aforementioned component (D) is 20 parts by mass or more and 45 parts by mass or less with respect to a total content of 100 parts by mass of the epoxy resins contained in the aforementioned epoxy resin composition, the aforementioned epoxy resin composition has a characteristic that, when cured and formed into a cured product, the aforementioned cured product has a glass transition temperature of 211° C. or higher and 215° C. or lower, and a viscosity at 100° C. of the resin composition including the aforementioned component (A), the aforementioned component (B), the aforementioned component (C) and the aforementioned component (D) is 5 Pa·s or more and 35 Pa·s or less.

In another aspect, the epoxy resin composition according to an embodiment of the present invention is an epoxy resin composition including:

a component (A), a component (B), a component (C) and a component (D); wherein the aforementioned component (A) contains tetraglycidyl diaminodiphenylmethane and a polymer thereof, the aforementioned component (B) is bisphenol A diglycidyl ether;

the aforementioned component (C) is an aromatic polysulfone resin obtained by polycondensation of bis(4-hydroxyphenyl) sulfone and bis(4-chlorophenyl) sulfone, the aforementioned aromatic polysulfone resin has a reduced viscosity of 0.20 dl/g or more and 0.27 dL/g or less, the aforementioned component (D) is bis(4-aminophenyl) sulfone;

a content of the aforementioned component (A) is 70 parts by mass or more and 80 parts by mass or less with respect to a total content of 100 parts by mass of epoxy resins contained in the aforementioned epoxy resin composition;

a content of the aforementioned component (B) is 20 parts by mass or more and 30 parts by mass or less with respect to a total content of 100 parts by mass of the epoxy resins contained in the aforementioned epoxy resin composition;

the aforementioned epoxy resin composition has a characteristic that, when cured and formed into a cured product, the aforementioned cured product has a glass transition temperature of 211° C. or higher and 215° C. or lower, and a viscosity at 100° C. of the resin composition including the aforementioned component (A), the aforementioned component (B), the aforementioned component (C) and the aforementioned component (D) is 5 Pa·s or more and 35 Pa·s or less.

Examples

The present invention will be described below with reference to examples, but the present invention is not limited to these examples.

[Epoxy Equivalent in Component (A)]

The epoxy equivalent of the component (A) was measured by the hydrochloric acid-dioxane method in accordance with JIS K7236.

[Content of Trimer in Component (A)]

The content of a trimer in the component (A) was calculated based on the measurement result of liquid chromatography (LC) analysis under the following conditions. More specifically, in the LC analysis, the sum of the peak areas detected during the retention time of 30 minutes to 35 minutes was used as the content of the trimer. The ratio of the sum of the peak areas detected during the retention time of 30 minutes to 35 minutes with respect to the sum of the peak areas detected during the retention time of 0 minutes to 35 minutes was adopted as the content of the trimer in the component (A).

(Conditions)

Sample: 5 μL of a solution prepared by dissolving 1 mg of a sample in 1 ml of acetonitrile was injected Apparatus: liquid chromatograph Nexera XR manufactured by Shimadzu Corporation Column: Sumipax ODS A-212 manufactured by Sumika Chemical Analysis Service, Ltd. Center (inner diameter: 6 mm, length: 150 m, film thickness: 5 μm)

Column temperature: 40° C.

[Reduced Viscosity of Aromatic Polysulfone Resin]

The reduced viscosity of an aromatic polysulfone resin was determined as follows. 1 g of an aromatic polysulfone resin was dissolved in N,N-dimethylformamide to adjust the volume to 1 dl, and the viscosity (η) of this solution was measured at 25° C. using an Ostwald type viscosity tube. Further, the viscosity ($\eta_0$) of N,N-dimethylformamide as a solvent was measured at 25° C. using an Ostwald type viscosity tube. Since the concentration of the above solution is 1 g/dl, the value of the specific viscosity ($(\eta-\eta_0)/\eta_0$) will be the value of the reduced viscosity in the unit of dl/g.

[Content of Phenolic Hydroxyl Group in Aromatic Polysulfone Resin]

A value obtained in the following manner was adopted as the content of a phenolic hydroxyl group in the aromatic polysulfone resin. First, a predetermined amount of aromatic polysulfone resin was dissolved in dimethylformamide, and then an excessive amount of p-toluenesulfonic acid was added thereto. Then, using a potentiometric titrator, titration was performed with a 0.05 mol/l potassium methoxide/toluene methanol solution, and after neutralizing the residual p-toluenesulfonic acid, the hydroxy group was neutralized. At this time, a value obtained by dividing the amount (moles) of potassium methoxide required for neutralization of the hydroxy group by the above-mentioned predetermined amount (g) of the aromatic polysulfone resin was used as the content of the phenolic hydroxyl group in the aromatic polysulfone resin.

[Glass Transition Temperature of Cured Product of Epoxy Resin Composition]

The glass transition temperature of the cured product of the epoxy resin composition was obtained based on the peak of tan δ measured using a dynamic viscoelasticity measuring device ("Q800" manufactured by TA Instruments, Inc.) under the following conditions.

(Conditions)
Measurement mode: tension mode
Amplitude: 20 μm
Frequency: 20 Hz
Rate of temperature increase: 5° C./min

[Viscosity of Resin Composition at 100° C.]

A value obtained from a viscosity curve obtained by using a parallel plate with a dynamic viscoelasticity measuring device (CVO model Rheometer manufactured by Bohlin Instruments Ltd.) under the following conditions was adopted as the viscosity of the resin composition at 100° C. It should be noted that in the examples and comparative examples, the resin composition is an epoxy resin composition.

(Conditions)
Measurement range: room temperature (about 20° C.) to 120° C.
Rate of temperature increase: 2° C./min
Strain: 10%
Frequency: 1 Hz
Plate distance: 1 mm

[Measurement of Number of Voids in Molded Body]

Hereinafter, scanning electron microscope (SEM) photographs (magnification: 5,000 times, accelerating voltage: 2 kV) of cross sections along the fiber directions of carbon fibers (reinforcing fibers) in the molded bodies obtained in the examples and comparative examples were taken, the number of voids at three different arbitrary places within a size of 30 mm×30 mm was counted, and an average value of these was calculated. It should be noted that in this measurement, places of black spots in the SEM photographs were counted as voids.

In the examples and comparative examples, the following materials were used as the component (A), the component (B) and the component (D).

Component (A): aromatic epoxy resin obtained in Production Example 1

Component (B): bisphenol A diglycidyl ether purchased from Sigma-Aldrich Japan

Component (D): bis(4-aminophenyl) sulfone purchased from Junsei Chemical Co., Ltd.

In the examples and comparative examples, the following materials were used as the aromatic polysulfone resins.

Component (C-1): aromatic polysulfone resin obtained in Production Example 2

Component (C-2): aromatic polysulfone resin obtained in Production Example 3

Component (C-3): aromatic polysulfone resin obtained in Production Example 4

Production of Component (A)

Production Example 1

4,4'-methylenedianiline (99.1 g), epichlorohydrin (231.3 g) and methyl isobutyl ketone (52.1 g) were placed in a reaction vessel equipped with a thermometer, a stirrer, a dropping funnel and a condenser attached with a separation tube. While maintaining the temperature inside the reaction system at 70° C., 48% sodium hydroxide (208 g) was continuously added dropwise over 2 hours. During this time, while maintaining the temperature at 70° C., water was cooled and liquefied, and the organic layer was allowed to react while being returned to the reaction system. After the completion of the reaction, unreacted epichlorohydrin was removed by concentration under reduced pressure, a byproduct salt and glycidyl ether were dissolved in 500 g of methyl isobutyl ketone, and a byproduct was removed by washing with water. Thereafter, methyl isobutyl ketone was distilled off under reduced pressure at 130° C. and 10 torr to obtain a component (A) containing tetraglycidyl diaminodiphenylmethane and a polymer thereof.

The epoxy equivalent of the obtained component (A) was 118 g/eq. Further, the content of a trimer in the component (A) was 2.9% by mass.

Production of Aromatic Polysulfone Resin

Production Example 2

Bis(4-hydroxyphenyl) sulfone (300.3 g), bis(4-chlorophenyl) sulfone (331.5 g) and diphenyl sulfone (560.9 g) as a polymerization solvent were placed in a polymerization tank equipped with a stirrer, a nitrogen inlet tube, a thermometer and a condenser attached with a receiver at the tip thereof, and the temperature was raised to 180° C. while circulating nitrogen gas inside the system. After adding potassium carbonate (160.1 g) to the obtained solution, the temperature was gradually raised to 290° C., and the reaction was further carried out at 290° C. for 3 hours. The obtained reaction solution was cooled to room temperature and solidified, and following fine crushing, the resultant was washed several times with warm water and a mixed solvent of acetone and methanol, and then dried by heating at 150° C. to obtain a component (C-1) as a white powder.

The reduced viscosity of the obtained component (C-1) was 0.27 dl/g. The content of the phenolic hydroxyl group in the component (C-1) was 169 μmol/g.

Production Example 3

The same operation as in Production Example 2 was performed except that the amounts of raw materials in Production Example 2 were changed to 100.1 g of bis(4-hydroxyphenyl) sulfone and 114.8 g of bis(4-chlorophenyl) sulfone, and diphenyl sulfone (188.2 g) and potassium carbonate (59.0 g) were used as polymerization solvents to obtain a component (C-2) as a white powder.

The reduced viscosity of the obtained component (C-2) was 0.50 dl/g. The content of the phenolic hydroxyl group in the component (C-2) was 49 μmol/g.

Production Example 4

The same operation as in Production Example 2 was performed except that the amounts of raw materials in Production Example 2 were changed to 300.3 g of bis(4- hydroxyphenyl) sulfone and 341.2 g of bis(4-chlorophenyl) sulfone, and diphenyl sulfone (564.8 g) and potassium carbonate (169.2 g) were used as polymerization solvents to obtain a component (C-3) as a white powder.

The reduced viscosity of the obtained component (C-3) was 0.41 dl/g. The content of the phenolic hydroxyl group in the component (C-3) was 61 μmol/g.

Production of Epoxy Resin Composition

Example 1

140 g of the component (A) obtained in Production Example 1, 60 g of bisphenol A diglycidyl ether (B) and 26 g of the component (C-1) obtained in Production Example 2 were placed in a 500 ml separable flask, the resulting mixture was stirred at 120° C. for 3 hours and then cooled to 100° C., 90 g of bis(4-aminophenyl) sulfone (D) was added thereto, and the resulting mixture was stirred at 100° C. for 1 hour to obtain an epoxy resin composition.

Example 2

An epoxy resin composition was obtained in the same manner as in Example 1 except that the amount of the component (C-1) was changed from 26 g to 40 g.

Example 3

An epoxy resin composition was obtained in the same manner as in Example 2 except that the amount of the component (A) was changed from 140 g to 160 g and the amount of the component (B) was changed from 60 g to 40 g.

Comparative Example 1

An epoxy resin composition was obtained in the same manner as in Example 1 except that 26 g of the component (C-1) was changed to 14 g of the component (C-2).

Comparative Example 2

An epoxy resin composition was obtained in the same manner as in Example 1 except that the component (C-1) was changed to the component (C-2).

Comparative Example 3

An epoxy resin composition was obtained in the same manner as in Example 1 except that 26 g of the component (C-1) was changed to 32 g of the component (C-3).

Comparative Example 4

An epoxy resin composition was obtained in the same manner as in Example 1 except that the amount of the component (A) was changed from 140 g to 100 g and the amount of the component (B) was changed from 60 g to 100 g.

Comparative Example 5

An epoxy resin composition was obtained in the same manner as in Example 1 except that the amount of the component (C-1) was changed from 26 g to 60 g.

Comparative Example 6

An epoxy resin composition was obtained in the same manner as in Example 3 except that 40 g of the component (C-1) was changed to 26 g of the component (C-2).

[Evaluation of Molded Body]

The epoxy resin compositions of Examples and Comparative Examples were uniformly coated on silicone-coated release paper using a reverse roll coater type resin coating apparatus to form resin films having a width of 20 cm. Subsequently, the uniformly aligned carbon fibers (TR50S15L manufactured by Mitsubishi Rayon Co., Ltd.) were sandwiched from both sides by the obtained resin films, and the pressure was adjusted appropriately at 100° C. using a press roller device to obtain a prepreg (fiber volume content: 55%, thickness: 0.17 mm) in which the carbon fibers were impregnated with the epoxy resin composition.

18 sheets of this prepreg were laminated in the same direction, and using the TA-200-1W press machine manufactured by Yamamoto Eng. Works Co., Ltd., press molding was performed under conditions at a temperature of 150° C. and a pressure of 3 MPa for 30 minutes, and then under conditions at a temperature of 180° C. and a pressure of 3 MPa for 60 minutes to produce a molded body. Using the molded body obtained here, the glass transition temperature and the number of voids in the molded body were measured.

Tables 1 and 2 show the glass transition temperature and viscosity at 100° C. of the cured products of the epoxy resin compositions used in the examples and comparative examples, and the number of voids in the molded bodies. It should be noted that each value of the components (A) to (D) in Table 1 and Table 2 means the content of each component with respect to the total content of 100 parts by mass of the component (A) and the component (B).

TABLE 1

|  | Ex. 1 | Ex. 2 | Ex. 3 |
| --- | --- | --- | --- |
| Component (A) | 70 | 70 | 80 |
| Component (B) | 30 | 30 | 20 |
| Component (C-1) | 13 | 20 | 20 |
| Component (D) | 45 | 45 | 45 |
| Glass transition temperature of cured product of epoxy resin composition (° C.) | 212 | 211 | 215 |
| Viscosity of epoxy resin composition at 100° C. (Pa · s) | 8 | 20 | 21 |
| Number of voids in molded body | 0 | 0 | 0 |

TABLE 2

|  |  | Comp. Ex. 1 | Comp. Ex. 2 | Comp. Ex. 3 | Comp. Ex. 4 | Comp. Ex. 5 | Comp. Ex. 6 |
| --- | --- | --- | --- | --- | --- | --- | --- |
| Component (A) |  | 70 | 70 | 70 | 50 | 70 | 80 |
| Component (B) |  | 30 | 30 | 30 | 50 | 30 | 20 |
| Component (C) | Component (C-1) | — | — | — | 13 | 30 | — |
|  | Component (C-2) | 7 | 13 | — | — | — | 13 |
|  | Component (C-3) | — | — | 16 | — | — | — |

TABLE 2-continued

|  | Comp. Ex. 1 | Comp. Ex. 2 | Comp. Ex. 3 | Comp. Ex. 4 | Comp. Ex. 5 | Comp. Ex. 6 |
| --- | --- | --- | --- | --- | --- | --- |
| Component (D) | 45 | 45 | 45 | 45 | 45 | 45 |
| Glass transition temperature of cured product of epoxy resin composition (° C.) | 212 | 211 | 211 | 190 | 210 | 213 |
| Viscosity of epoxy resin composition at 100° C. (Pa·s) | 8 | 20 | 20 | 6 | 37 | 21 |
| Number of voids in molded body | 12 | 22 | 18 | 2 | 8 | 15 |

As shown in Tables 1 and 2, it was confirmed that voids were not generated in the molded bodies of Examples 1 to 3 to which the present invention was applied.

Usually, if the viscosities of the epoxy resin compositions used are at the same level, it is considered that the number of voids would also be about the same. However, while voids were generated in the molded body of Comparative Example 1, surprisingly, voids were not generated in the molded body of Example 1 using the epoxy resin composition having the same level of viscosity as that of Comparative Example 1.

The contents of the aromatic polysulfone resins are different between Example 1 and Comparative Example 1. In order to verify the influence of the difference in the content of the aromatic polysulfone resin on the generation of voids, the molded body of Comparative Example 2 was produced by adjusting the content of the aromatic polysulfone resin to the same level as in Example 1. As a result, voids were generated in the molded body of Comparative Example 2 even though the content of the aromatic polysulfone resin was the same as in Example 1. In other words, it is considered that the difference in the content of the aromatic polysulfone resin has little influence on the generation of voids.

Although the cause of the generation of voids remains unknown, it is considered that the reduced viscosity of the used aromatic polysulfone resin being 0.30 dl/g or less affected the generation of voids.

Similarly, voids were generated in the molded bodies of Comparative Examples 2 and 3, whereas voids were not generated in the molded body of Example 2 using the epoxy resin composition having the same level of viscosity as those of Comparative Examples 2 and 3. These results are unexpected results from ordinary epoxy resin compositions.

From the above, it can be said that the molded bodies of Examples 1 to 3 in which no voids are generated have high mechanical properties and solvent resistance. Further, it can be said that in Examples 1 to 3, epoxy resin compositions capable of obtaining such molded bodies having high mechanical properties and solvent resistance were obtained.

From the above results, it was confirmed that the present invention is useful.

INDUSTRIAL APPLICABILITY

The present invention can provide an epoxy resin composition capable of obtaining a molded body having high impact resistance, mechanical properties and solvent resistance, a prepreg and a molded body, and is therefore extremely useful industrially.

The invention claimed is:

1. An epoxy resin composition comprising:
   the following component (A), component (B), component (C) and component (D); wherein
   a content of said component (A) is 60 parts by mass or more and 90 parts by mass or less with respect to a total content of 100 parts by mass of epoxy resins contained in said epoxy resin composition;
   a content of said component (B) is 10 parts by mass or more and 40 parts by mass or less with respect to a total content of 100 parts by mass of the epoxy resins contained in said epoxy resin composition;
   said epoxy resin composition has a characteristic that, when cured and formed into a cured product, said cured product has a glass transition temperature of 200° C. or higher;
   a viscosity at 100° C. of the resin composition comprising said component (A), said component (B), said component (C) and said component (D) is 5 Pa·s or more and 35 Pa·s or less, and
   said component (A) contains a trimer of monomers of the component (A), and a content of the trimer contained in the component (A) is 3% by mass or less with respect to a total mass of the component (A),
   Component (A): an aromatic epoxy resin having at least 3 glycidyl groups in one molecule;
   Component (B): an aromatic epoxy resin having two glycidyl groups in one molecule;
   Component (C): an aromatic polysulfone resin having a reduced viscosity of 0.18 dl/g or more and 0.30 dl/g or less; and
   Component (D): an aromatic amine compound.

2. The epoxy resin composition according to claim 1, wherein an epoxy equivalent of said component (A) is 125 g/eq or less.

3. The epoxy resin composition according to claim 1, wherein a content of a phenolic hydroxyl group in said component (C) is 100 µmol/g or more and 350 µmol/g or less with respect to a mass of said component (C).

4. The epoxy resin composition according to claim 1, wherein said component (D) is diaminodiphenyl sulfone or a derivative thereof.

5. The epoxy resin composition according to claim 4, wherein said component (D) comprises the following component (D-1),
   Component (D-1): 4,4'-diaminodiphenyl sulfone.

6. The epoxy resin composition according to claim 5, wherein said component (D) further comprises the following component (D-2), and
   a mass content ratio (D-2)/(D-1) of said component (D-1) and said component (D-2) is less than 1,
   Component (D-2): 3,3'-diaminodiphenyl sulfone.

7. A prepreg in which a reinforcing fiber is impregnated with the epoxy resin according to claim 1.

8. The prepreg according to claim 7, wherein said reinforcing fiber is a carbon fiber.

9. A molded body formed of a cured product of the prepreg according to claim 7.

* * * * *